(12) United States Patent
Aue et al.

(10) Patent No.: US 8,699,623 B2
(45) Date of Patent: Apr. 15, 2014

(54) MODEM ARCHITECTURE

(75) Inventors: Volker Aue, Dresden (DE); Lars Melzer, Dresden (DE)

(73) Assignee: Intel Mobile Communications GmbH, Neubiberg (DE)

(*) Notice: Subject to any disclaimer, the term of this patent is extended or adjusted under 35 U.S.C. 154(b) by 421 days.

(21) Appl. No.: 12/981,609

(22) Filed: Dec. 30, 2010

(65) Prior Publication Data

US 2011/0158301 A1 Jun. 30, 2011

(30) Foreign Application Priority Data

Dec. 30, 2009 (EP) .................................... 09016150

(51) Int. Cl.
*H04L 27/00* (2006.01)
(52) U.S. Cl.
USPC .......................................................... 375/316
(58) Field of Classification Search
USPC ............ 375/219, 222, 284, 316, 354; 710/22, 710/35, 51, 52, 105, 110, 316; 712/28, 32, 712/34, 35, 201, 222; 714/27
See application file for complete search history.

(56) References Cited

U.S. PATENT DOCUMENTS

| | | | |
|---|---|---|---|
| 7,320,037 B1 | 1/2008 | Maturi et al. | |
| 7,415,595 B2 | 8/2008 | Tell et al. | |
| 2002/0181571 A1* | 12/2002 | Yamano et al. | 375/222 |
| 2003/0081580 A1 | 5/2003 | Vaidyanathan et al. | |
| 2005/0091428 A1* | 4/2005 | Matsumoto et al. | 710/52 |
| 2006/0271765 A1 | 11/2006 | Tell et al. | |
| 2007/0140122 A1 | 6/2007 | Murthy | |
| 2009/0265483 A1* | 10/2009 | Alexandre | 710/22 |

* cited by examiner

*Primary Examiner* — Sam K Ahn
*Assistant Examiner* — Shawkat M Ali
(74) *Attorney, Agent, or Firm* — SpryIP, LLC

(57) ABSTRACT

A modem device for use in a wireless communications terminal comprises a plurality of functional units to perform signal processing tasks which are connected in a ring structure. Each of the functional units comprises a local processor, a plurality of hardware accelerators and a switching matrix connected between a data input of the respective functional unit and each of the sub-components. The local processor receives task instructions from a controller of the modem device over a first bus system that uses a first protocol which includes addressing, and in response to the task instructions configures the hardware accelerators and switches the switching matrix to selectively produce connections between the data input and the hardware accelerators in a manner to perform the intended task. Data flow occurs in a ring structure between said functional units and through each of the functional units using a second protocol without addressing.

4 Claims, 4 Drawing Sheets

SSL data transfers

MODEM ARCHITECTURE

CROSS REFERENCE TO RELATED APPLICATIONS

This application claims priority of European Patent Application No. 09016150.6 filed on Dec. 30, 2009, the entire disclosure of this application being hereby incorporated herein by reference.

FIELD OF THE INVENTION

The present invention relates to a modem architecture, and in particular relates to a modem device for use in a wireless communications terminal.

BACKGROUND OF THE INVENTION

Cellular systems are used to offer wireless telephony and data services to their users. The new cellular standard developed by the 3$^{rd}$ generation partnership program (3GPP) called Long Term Evolution (LTE) offers unprecedented data rates and unprecedented shortest latency to the end customer while at the same time promising a high spectral capacity to the network operator. This allows network operators to make best use of the available spectrum. Spectrum efficiency is achieved by a plurality of modes such as downlink Tx diversity, beam forming, and spatial multiplexing. Those modes are partly signaled within the physical layer as well as by higher protocol layers.

The classical modem architecture typically consists of a series of digital signal processing blocks or segments thereof that are connected together in a fixed way. A processor is used to control the data flow and is partly used for low rate signal processing. The exchange of data can be realized through a shared memory. As bit width and signal processing hardware are tailored to the application's requirements, purely hardware based modems can be implemented very power efficiently while minimizing required silicon area. The disadvantage of such architectures is their inflexibility. Such modems are designed for one particular standard and for one set of particular algorithms. Modifications in the algorithms which may be necessary to overcome some limitations that only become visible in the field, almost always require modifications in hardware that are both time consuming and costly.

More recently, Software Defined Radio (SDR) architectures have been proposed. SDRs are based on one or multiple powerful digital signal processors (DSPs) onto which the various signal processing tasks are mapped. As the DSPs are relatively general purpose, the architecture is very flexible. In SDR architectures, the signal processing is implemented in software. Disadvantages of those architectures, however, are:

High silicon cost compared to hard-wired solution, as the signal processors bit width of the data path and the memory (storage) cannot be tailored to the algorithms to the extend hard wired logic can. Traditional DSPs for signal processing support bit widths of 16 bit, 8 bit, and 32 bit. Some support 24 bit. Bit widths like 9 bit, 10 bit, 6 bit that are often sufficient to reach the required performance, are not supported.

Also, signal processors carry a relatively large overhead for program control, address generation, debugging support, and general purpose instructions out of which only a subset is actually used. In order to maximize the hardware utilization, as many algorithms as possible are loaded on those DSPs. This approach brings additional drawbacks:

The required clock frequency rises, increasing the power consumption of the IC, as more logic (e.g. additional pipeline stages) is required to achieve those speeds. The high speeds in the processing hardware imply memory bandwidth limitations. Faster memories become required. Faster memories, however, consume substantially more power than power optimized memories that tend to be slower.

Algorithms run at different rates and are not always synchronized with one another. Mapping those algorithms on a single processor requires careful task management with different prioritization and resource management. The number of different cases that need to be considered grows with the number of states. Testing effort to reach certain stability is high compared to an approach where algorithms are implemented on separate hardware.

Modern modem standards require multiple tasks that are not fully synchronized, and lengths of processing operations are data dependent, such as:

Downlink control channel receive including decoding
Cell search
Parameter and channel estimation
Downlink data channel receive
Uplink coding modulation.

That is why scheduling of such tasks is complex and cannot be known a priori.

To cope with these problems it is known to implement real-time operating systems on very fast processors, see e.g. U.S. Pat. No. 7,415,595B2, by Tell et al. Such processors, however, involve high clock rates and therefore have the main drawback to be power hungry.

What is needed, therefore, is a modem architecture which allows to realize a low power, low size wireless communication device.

SUMMARY OF THE INVENTION

The invention provides a modem device for use in a wireless communications terminal which comprises a plurality of functional units to perform signal processing tasks. In particular, each of the functional units is dedicated to one or more tasks.

A task, for the purpose of the invention, is defined as a logical combination of signal processing operations with a clearly defined purpose. Exemplary tasks are: downlink control channel receive including decoding; cell search; parameter and channel estimation; downlink data channel receive; uplink coding modulation. In other words, dedicated functions are mapped on dedicated functional units.

As far as the data flow is concerned, the functional units are arranged in a ring architecture. Advantages hereof are: data path connections only occur where they are needed; loop back mode and hierarchical component based design are possible.

Each of the functional units comprises a plurality of subcomponents including a local reduced instruction set computer (RISC) or digital signal processor, a plurality of hardware accelerators and, optionally, at least one memory module. Also, each of the functional units comprises a switching matrix connected between a data input of the respective functional unit and each of said sub-components. The switching matrix can be configured at run time.

The local processor is adapted to receive task instructions from a controller of the modem device over a first bus system using a first protocol. The first protocol includes addressing and may be an advance high-performance bus (AHB) based protocol. The local processor, in response to the task instructions from the controller, configures the sub-components and switches the switching matrix to selectively produce connections between said input and said sub-components in a manner to perform said task.

The data flow in said ring structure between said functional units and within each functional unit is performed using a second protocol without addressing.

So the switching matrix enables to virtually freely arrange the accelerators within one functional unit and also enables a very simple protocol for data transfer to be used between the signal processing blocks without any addressing.

The second protocol may comprise three binary signals including a valid and an accept signal for handshaking between a data source and a data sink, and a frame signal which marks the beginning and the end of a logical group of data elements within a data stream.

The functional units are selected from a group consisting of a digital front end (DFE) unit, LTE transmit (Tx) unit, shared random access memory (RAM) unit, forward error correction (FEC) data unit, fast Fourier transform (FFT) unit, parameter estimation unit, equalizer unit, searcher unit, and FEC control unit.

Since, in the novel architecture, multiple tasks of signal processing that are to be performed in a modem device for wireless communication are distributed over multiple components such that each task is performed in one component, the following advantages are provided:

Lower clock rates which translates into lower power consumption;

Ease of programming;

Scheduling of tasks is data driven and by control message.

Another advantage of the novel architecture is that it provides high level message interfaces for each component. Also the efficient bus architecture provides for a low power, low size modem for use in a wireless communications terminal.

Finally, the switch matrix allows reconfiguring the flow at run-time.

DETAILED DESCRIPTION OF THE FIGURES

Figure 1:
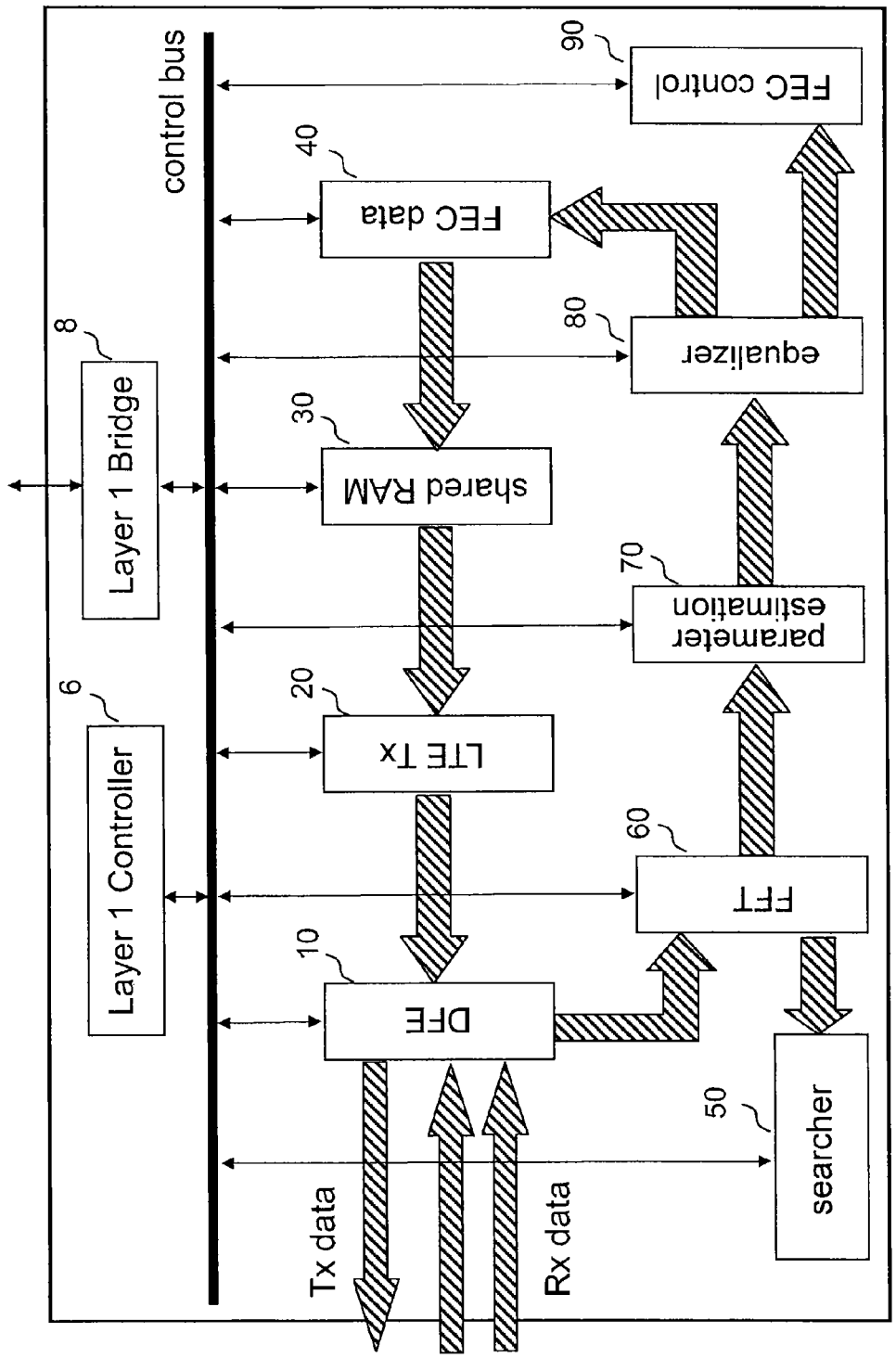
FIG. 1 illustrates datapaths between functional units of one embodiment of the invention.

FIG. 1 illustrates data paths in one embodiment of the invention, in particular an LTE layer 1 subsystem, comprising a layer 1 bridge 8, a layer 1 controller 6 and a plurality of functional units 10-90. The bus system of the novel modem is implemented using two different SoC (system on chip) interconnect standards. The high rate data streams are distributed using a simple streaming protocol without addressing (illustrated in large hatched arrows) which is referred to as Simple Streaming Link (SSL) protocol below and will be described in detail with reference to FIG. 4. The low rate and control accesses are done over a second protocol that comprises addressing, e.g. an AHB based protocol (illustrated in thin arrows).

Figure 2:
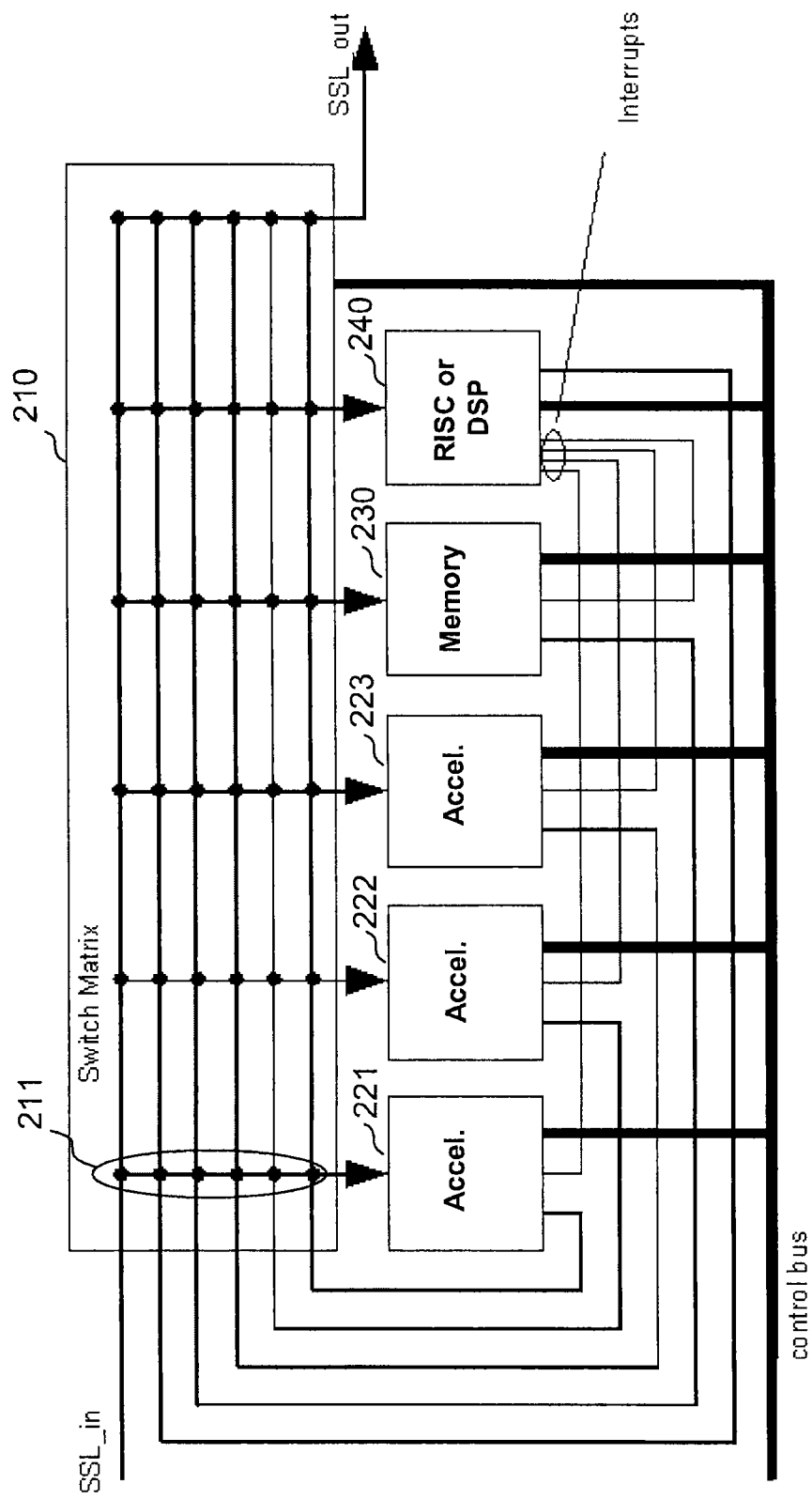
FIG. 2 shows the generic component architecture of any of the functional units of FIG. 1.

FIG. 2 shows the generic component architecture of any of the functional units 10-90 of FIG. 1. The components may have multiple SSL inputs and multiple SSL outputs. Interrupt controller and timer (not shown) can be arranged internally or externally of the RISC or DSP processor.

Each of functional units 10-90 comprises a plurality of sub-components including a local RISC or digital signal processor 240, a plurality of hardware accelerators 221-223, and, optionally, at least one memory module 230. Also, each of the functional units comprises a switching matrix 210 connected between a streaming data input of the respective functional unit and each of said sub-components. So each column of six points, as exemplified by reference numeral 211, may be understood as a seven point switch the points representing potential connection points. The switching matrix can be configured at run time.

Local processor 240 is adapted to receive task instructions from a controller 6 of the modem device (shown in FIG. 1) over a first bus system using a first protocol. The first protocol includes addressing and may be a AHB based protocol. The local processor, in response to the task instructions from the controller, configures the sub-components 221-223, 230 and switches switching matrix 210 to selectively produce connections between the data streaming input and said sub-components in a manner to perform the dedicated task.

In a modification of the invention, a component may have multiple streaming data inputs and multiple streaming data outputs. Also, the switching matrix can be sparse.

Figure 3:
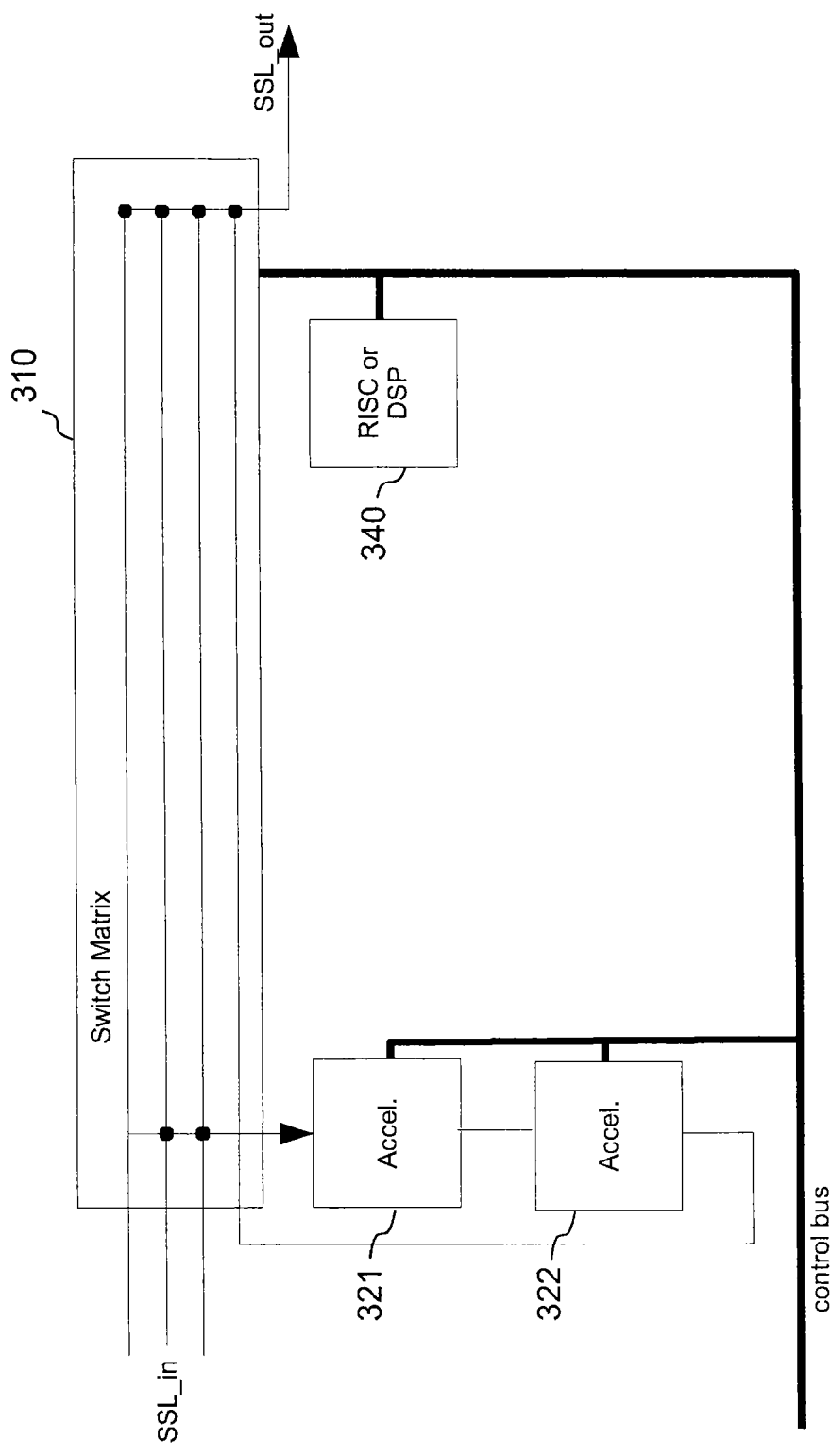
FIG. 3 shows a modification of the component architecture of FIG. 2.

FIG. 3 shows a modification of the component architecture of FIG. 2. Here, accelerators are cascaded. The switching matrix is illustrated as a sparse matrix. Moreover, three streaming data inputs and one streaming data output are illustrated. The RISC processor is not connected to the data path of the switching matrix.

Characteristics of the Novel Architecture are:

Tasks are distributed over multiple components. Local control for each task is provided. Local internal communications are possible. Also, a software message interface is provided. All accelerators, memory modules and switch matrices are configured by the local control, though theoretically being addressable through the control bus, e.g. via AHB. The novel architecture is a hierarchical architecture.

The data streaming based processing implies a notion of time through data samples. Processing occurs as fast as data can be processed and data is available.

The memory modules may contain an arbiter for arbitration between the first and second protocol. Also, the memory modules may have means for internal address generation.

Figure 4:
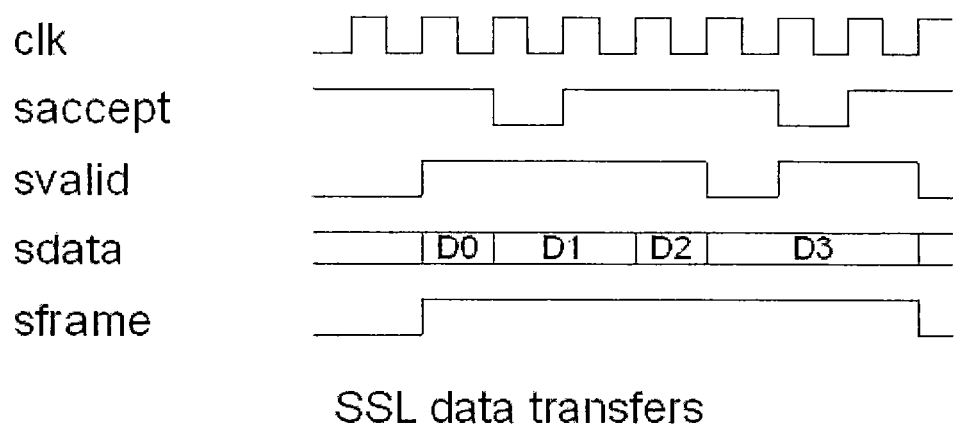
FIG. 4 shows one embodiment of the streaming signals used for distributing data along the ring structure of FIG. 1.

FIG. 4 shows details about the streaming signals that may be used for distributing data along the ring structure (which data stream is illustrated in FIG. 1 by large hatched arrows) and through each of the functional units 10-90 as exemplified in FIG. 2 or FIG. 3. This data streaming protocol which is referred to as Simple Streaming Link (SSL) protocol comprises four signals: sdata, svalid, saccept, sframe, as shown in FIG. 4. A data signal can have a width of multiple bits, e.g. 7, 16, 24, 32 bits. Data source and data sink must have the same understanding of what the sframe signal means. Data source and data sink, herein, can be any of the functional units 10-90 of FIG. 1 and/or any of the sub-components illustrated in FIG. 2 and FIG. 3. The clock signal 'clk' is derived from a common clock of the data source and data sink.

There are four possible application cases of the sframe signal:
(1) Data transfer only occurs if saccept, svalid and sframe signals are high. The sframe signal marks the beginning and end of a data block transfer. In the example of FIG. 4, the data 'frame' is composed of data elements D0, D1, D2, and D3.
(2) Two streams are multiplexed over one link, and the sframe signal is used to distinguish between the first and the second stream.
(3) The sframe is used to distinguish between data transfer and control transfer.
(4) The sframe signal is not used in which case the sframe signal is always set to high.

The source can set the svalid and sframe signals in advance.
The sink can set the saccept signal in advance.

A 'frame' in the sense of the invention is a logical group or sequence of data, such as e.g. an OFDM symbol, a block of control data, a block of information data, etc.

The sframe signal can e.g. be used to mark the beginning and the end of a logical group or sequence; for synchronization between functional components of a communication device on data level; to differentiate between control and data information; to differentiate between two separate data streams transmitted over the same SSL; and/or for control purposes, e.g. for dynamic clock gating to decrease power consumption.

One major advantage of employing the SSL protocol for streaming data through the modem architecture is that the sink does not need to count data to detect the end of a logical group/sequence. Also, the SSL protocol can be used for activity detection, power control and/or reconfiguration control of a switching matrix and accelerators of functional subsystems in an IC architecture for a communications device.

The following table summarizes SSL signals:

| Signal | Source | Sink | Description |
|---|---|---|---|
| sdata | output 1 ... n bits | input 1 ... n bits | Streaming data element. Standard width is 32 bits. The Data width is the minimum granularity the SSL supports. |
| svalid | output 1 bit | input 1 bit | The valid/accept handshake is used to drive and stall the communication from source to sink. |
| saccept | input 1 bit | output 1 bit | Source and sink can set or reset these signal at any time. Data is taken over if both are 'high' on the rising edge of the clock. |
| sframe | output 1 bit | input 1 bit | Set to 'high' during one block transfer, e.g. 2048 words of data. The sink can determine the start of the transfer by looking for a rising edge and the end by looking for a falling edge. The svalid signal might not be active in the first cycle. sframe is 'low' after a block transfer. |

In case the sframe signal is not used by a source, it can clamp the output to "high". In case a sink does not know how to interpret an incoming sframe signal, it can be ignored.

The invention claimed is:

1. A modem device for use in a wireless communication terminal, the modem device comprising: a plurality of functional units configured to perform signal processing tasks, wherein: said plurality of functional units are connected in a ring structure; each of the functional units comprises a plurality of sub-components including a local processor, a plurality of hardware accelerators and further comprises a switching matrix connected between a data input of a respective functional unit and each of said sub-components; said local processor configured to receive task instructions from a controller of the modem device over a first bus system using a first protocol which includes addressing and an advanced high-performance bus (AHB) based protocol and, in response to said task instructions, arranged to configure the sub-components and configured to switch the switching matrix to selectively produce connections between said data input and said sub-components in a manner to perform said task; and wherein data flow in said ring structure between said functional units and within each functional unit is performed using a second protocol without addressing, said second protocol further configured to have three binary signals including a valid and an accept signal for handshaking between a data source and a data sink, and a frame signal which marks a beginning and an end of a logical group of data elements within a data stream.

2. The modem device of claim 1 wherein said local processor comprises at least one of a reduced instruction set computer (RISC) and a digital signal processor.

3. The modem device of claim 2, wherein at least one of the functional units comprises at least one memory module.

4. The modem device of claim 1 wherein said respective functional unit is one of a group consisting of a digital front end (DFE) unit, Long Term Evolution transmit (LTE Tx) unit, shared random access memory (RAM) unit, forward error correction (FEC) data unit, fast Fourier transform (FFT) unit, parameter estimation unit, equalizer unit, searcher unit, and FEC control unit.

* * * * *